(12) United States Patent
Thye-Moormann

(10) Patent No.: US 11,255,402 B2
(45) Date of Patent: Feb. 22, 2022

(54) SPRING ELEMENT FOR A VEHICLE SHOCK ABSORBER, AND VEHICLE SHOCK ABSORBER AND VEHICLE HAVING SAME

(71) Applicant: BASF SE, Ludwigshafen am Rhein (DE)

(72) Inventor: Frank Thye-Moormann, Lembruch (DE)

(73) Assignee: BASF SE, Ludwigshafen am Rhein (DE)

( * ) Notice: Subject to any disclaimer, the term of this patent is extended or adjusted under 35 U.S.C. 154(b) by 190 days.

(21) Appl. No.: 16/093,871

(22) PCT Filed: Apr. 18, 2017

(86) PCT No.: PCT/EP2017/059168
§ 371 (c)(1),
(2) Date: Oct. 15, 2018

(87) PCT Pub. No.: WO2017/182460
PCT Pub. Date: Oct. 26, 2017

(65) Prior Publication Data
US 2019/0113097 A1 Apr. 18, 2019

(30) Foreign Application Priority Data
Apr. 18, 2016 (EP) .................................. 16165744

(51) Int. Cl.
*B60G 11/22* (2006.01)
*F16F 1/376* (2006.01)
(Continued)

(52) U.S. Cl.
CPC .............. *F16F 9/58* (2013.01); *B60G 11/22* (2013.01); *F16F 1/376* (2013.01); *F16F 1/3732* (2013.01);
(Continued)

(58) Field of Classification Search
CPC ....... B60G 11/22; B60G 11/225; B60G 11/24; B60G 2202/14; B60G 2202/143; F16F 1/3732; F16F 1/376; F16F 9/58
See application file for complete search history.

(56) References Cited

U.S. PATENT DOCUMENTS 5,078,370 A * 1/1992 McClellan ........... B60G 15/068
267/220
5,308,104 A * 5/1994 Charles .................. B60G 11/52
267/220
(Continued)

FOREIGN PATENT DOCUMENTS

DE 195 48 770 A1 6/1997
DE 195 48 771 A1 6/1997
(Continued)

OTHER PUBLICATIONS

International Search Report dated May 23, 2017, in PCT/EP2017/059168 filed Apr. 18, 2018.
(Continued)

*Primary Examiner* — Barry Gooden, Jr.
(74) *Attorney, Agent, or Firm* — Grüneberg and Myers PLLC

(57) ABSTRACT

A spring element for a vehicle shock absorber. The spring element includes a longitudinal axis and a basic body that extends along the longitudinal axis and is deformable resiliently between an uncompressed basic state and a state compressed in the direction of a longitudinal axis, and which includes an end side with a stop surface configured for contact against a damper cap of the vehicle shock absorber. The stop surface is at least partially structured. A passenger motor vehicle car can include such a spring element.

16 Claims, 3 Drawing Sheets

Figure 1:
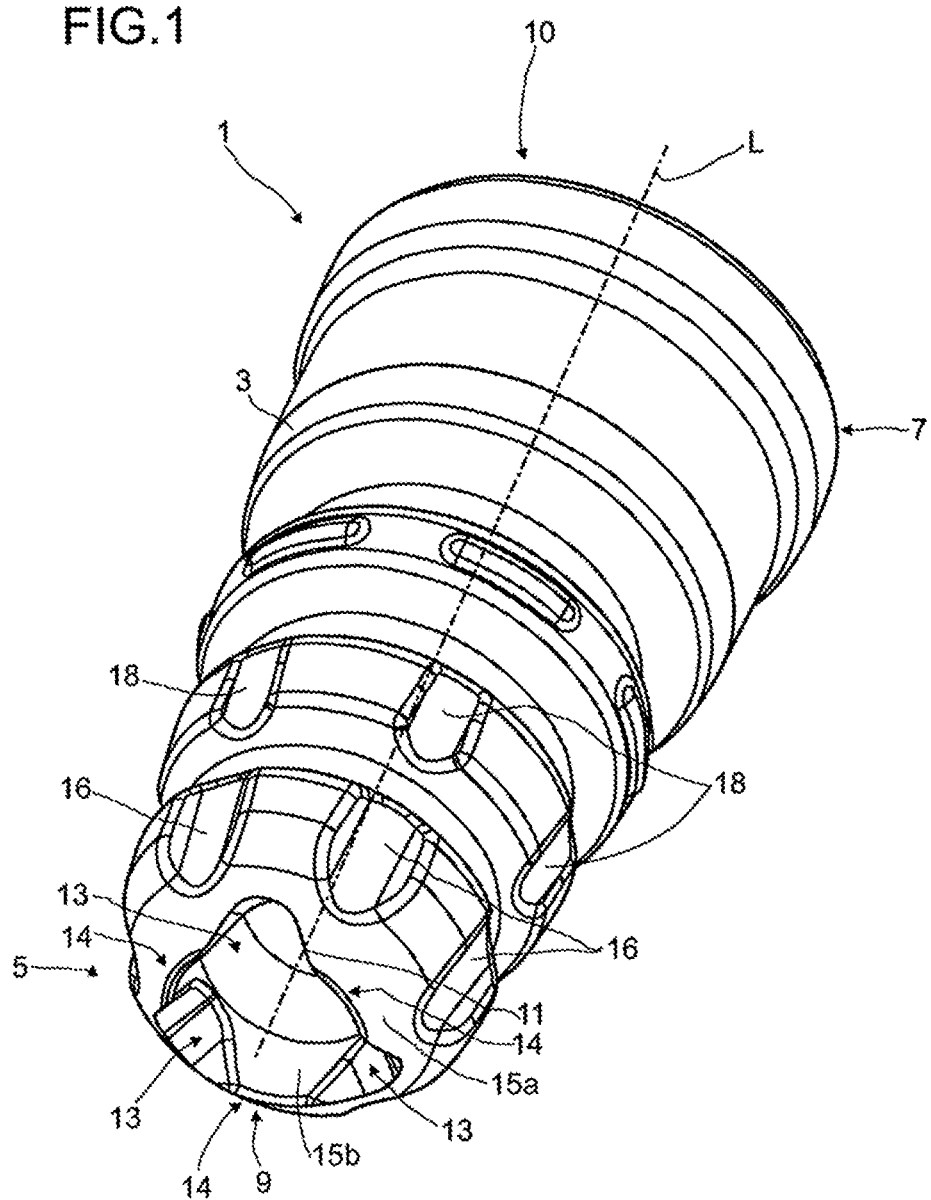

(51) Int. Cl.
  *F16F 9/58* (2006.01)
  *F16F 1/373* (2006.01)

(52) U.S. Cl.
  CPC .... *B60G 2202/143* (2013.01); *B60G 2206/42* (2013.01); *F16F 2224/025* (2013.01); *F16F 2230/00* (2013.01); *F16F 2230/02* (2013.01)

(56) References Cited

U.S. PATENT DOCUMENTS

| | | | | |
|---|---|---|---|---|
| 5,901,947 | A * | 5/1999 | Fotino | F16F 9/58 267/220 |
| 6,092,819 | A * | 7/2000 | Overby | B60G 3/185 280/124.153 |
| 9,982,735 | B2 * | 5/2018 | Thye-Moormann | F16F 1/3732 |
| 2006/0049604 | A1 * | 3/2006 | Okamoto | F16F 9/58 280/124.116 |
| 2009/0288923 | A1 * | 11/2009 | Hwang | F16F 1/3732 188/268 |
| 2010/0025903 | A1 * | 2/2010 | Thye-Moormann | F16F 1/3732 267/153 |
| 2011/0133380 | A1 * | 6/2011 | Harden | F16F 1/376 267/292 |
| 2011/0140326 | A1 * | 6/2011 | Wolff | F16F 1/3732 267/153 |
| 2013/0113145 | A1 * | 5/2013 | Abe | F16F 9/54 267/220 |
| 2013/0285301 | A1 * | 10/2013 | Fedullo | F16F 1/44 267/292 |
| 2015/0076784 | A1 * | 3/2015 | Al-Dahhan | B60G 11/22 280/124.177 |
| 2015/0158363 | A1 * | 6/2015 | Patil | B60G 15/068 267/220 |
| 2016/0347140 | A1 * | 12/2016 | Suzuki | B29C 39/02 |
| 2017/0240015 | A1 * | 8/2017 | Im | F16F 1/377 |
| 2019/0113097 | A1 | 4/2019 | Thye-Moormann | |
| 2019/0118599 | A1 * | 4/2019 | Marek | F16F 1/376 |
| 2019/0136929 | A1 * | 5/2019 | Thye-Moormann | F16F 1/3713 |

FOREIGN PATENT DOCUMENTS

| | | |
|---|---|---|
| DE | 10 2004 049 638 A1 | 4/2006 |
| DE | 10 2014 206 756 A1 | 10/2015 |
| EP | 0 036 994 A2 | 10/1981 |
| EP | 0 062 835 A1 | 10/1982 |
| EP | 0 250 969 A1 | 1/1988 |
| EP | 0 382 645 A1 | 8/1990 |
| WO | WO 2010/020588 A1 | 2/2010 |

OTHER PUBLICATIONS

European Office Action dated Aug. 8, 2019 in Patent Application No. 17 717 738.3, 7 pages.

* cited by examiner

SPRING ELEMENT FOR A VEHICLE SHOCK ABSORBER, AND VEHICLE SHOCK ABSORBER AND VEHICLE HAVING SAME

The present invention relates to a spring element for a vehicle shock absorber. The invention furthermore relates to a vehicle shock absorber having such a spring element, and to a vehicle, in particular a passenger motor vehicle, having such a shock absorber.

Spring elements of the aforementioned type are generally known. They are used in cars, for example inside the chassis. They are used in particular as vibration-damping spring elements. In addition to the main shock absorber, which is frequently based on metal springs and/or compressed gas elements, use is virtually always made of yet further spring elements (additional shock absorbers), preferably composed of resilient material. These spring elements are customarily hollow bodies which are formed concentrically and have different diameters and/or wall thicknesses along the spring axis. In principle, these spring elements could also act as main shock absorbers, but they frequently take on an end stop function in combination with the main shock absorber. They influence the force-travel characteristic of the sprung wheel here by the formation or reinforcement of progressive characteristic of the vehicle suspension. The pitching effects of the vehicle can thus be reduced and the rolling support reinforced. In particular, the starting rigidity is optimized by the geometrical configuration; this has a crucial effect on the suspension comfort of the vehicle. This function increases the driving comfort and ensures a very high degree of driving safety. The specific configuration of the geometry results in virtually constant component properties over the service life.

One difficulty of the three-dimensional configuration of the additional springs resides in a frequently desired, particularly soft use of the force absorption, which is also referred to as soft starting of the spring element. In order to achieve such a soft starting, laid-open application DE 102004049638, for example, describes encircling bending lips which is also referred to as a "flower shape". However, the extension of the bending lip is limited because of the geometry of the additional spring, and therefore the soft starting can also be varied only within highly confined limits. This shaping with a bending lip is also only suitable to a certain extent for particularly high loadings. Furthermore, the bending lip has substantial disadvantages in production, which is predominantly realized by foaming. During the casting operation, the hollow space in the spring element is customarily defined by a core, from which the spring element has to be pulled after the curing. The resulting loadings of the tightly fitting bending lip lead to a not insignificant amount of waste. A further disadvantage resides in the expensive deburring associated with the manufacturing of the bending lip.

In addition to the endeavor to achieve as soft a starting behavior of the spring element as possible, there is interest in industry in general and in the vehicle industry in particular in eliminating annoying noises as substantially as possible. Annoying noises are also caused inter alia by the chassis and the shock absorbers installed there. It has been noted as disadvantageous in the prior art that the spring elements may have a tendency to emit squeaking noises because of their extreme compression in the event of the shock absorber being maximally impacted.

Against this background, the invention was based on the object of improving the spring element mentioned at the beginning to the effect that the noise emission is reduced as far as possible. In particular, the invention was furthermore based on the object of further improving the stopping or starting behavior of the spring element.

The invention achieves the object on which it is based with a spring element of the type mentioned at the beginning according to a first aspect by the invention proposing a spring element for a vehicle shock absorber, having a longitudinal axis and a basic body which extends along the longitudinal axis and is resiliently deformable between an uncompressed basic state and a state compressed in the direction of the longitudinal axis, and which has an end side with a contact surface formed for contact against a damper cap of the vehicle shock absorber, wherein at least the contact surface, preferably the entire surface, is partially or completely structured.

The invention is based on the finding that, during compression of the spring element, squeaking or rubbing noises arise in particular whenever the contact surface, which is provided on the spring element, lies against the damper cap of the shock absorber, and, as a result of progressing compression of the spring element transversely with respect to the compression direction, which substantially takes place in the direction of the longitudinal axis, the material of the spring element yields radially inward and outward. The contact surface is moved radially relative to the damper cap under the influence of shearing forces, as a result of which the stick/slip effect occurs. The stick/slip effect denotes the sliding back of bodies moved counter to each other. It occurs in particular wherever the static friction is notably greater than the sliding friction. Surface parts of the friction partners which are coupled in a damped manner exert a sequence of adhesion, bracing, separation, and sliding off, as a result of which vibrations which are perceivable by sensor are generated. Due to the rapid sequence of adhesion and sliding, annoying noises perceived as squeaking arise. This is where the invention starts by the contact surface being at least partially, but particularly preferably completely, structured. The structuring of the surface results in the application in a targeted manner of irregularity to the surface, which improves the adhesion capacity of the surface. The contact surface and the damper cap can to a certain extent better interlock in each other, and the occurrence of the stick/slip effect is thereby significantly minimized. Significantly lower noise emissions occur as a result.

In a particularly preferred development of the invention, the structure of the contact surface is configured in the form of irregular structuring, particularly preferably in the form of graining.

In an alternative preferred development, the structure of the contact surface is configured in the form of regular structuring, particularly preferably in the form of simple or crosswise grooving, pimpling or polygonal contouring.

Furthermore preferably, the structure has a multiplicity of structural elevations and structural depressions, wherein the structural elevations are separated from one another by means of the structural depressions.

The structure preferably has an average peak to valley height $R_Z$ within the range of 25 to 500 µm, preferably within a range of between 100 and 350 µm, particularly preferably 250 mm +/−10%. The average peak to valley height is understood as meaning the average value from the individual peak to valley heights of five consecutive individual measurement sections. The average peak to valley height $R_Z$ is preferably determined in accordance with EN ISO 25178, for example by means of visual measuring methods.

In a further preferred refinement, the end side of the basic body has an encircling end edge in the basic state. The end edge defines that region of the contact surface or that part of the spring element which comes first into contact with the damper cap. By configuration of this region of the spring element as an edge, the surface of the first contact is significantly minimized in relation to known solutions, in which a larger surface strikes against the damper cap, with a soft starting behavior being the result. The end edge is preferably rounded inward and/or outward. This is preferably realized with radii which are identical or differ from one another. Alternatively, it is preferred to provide the end edge with one or more phases which can likewise be configured identically or differently from one another.

According to a preferred embodiment, the structured contact surface extends radially outside and/or inside the end edge with respect to the longitudinal axis. It has turned out to be particularly advantageous to configure and to structure the contact surface on both sides of the end edge.

In a further preferred embodiment of the invention, the basic body has at least one encircling groove which is spaced apart from the end side, wherein the structured contact surface extends as far as the groove. The groove which is formed transversely with respect to the longitudinal axis firstly defines that end of the end portion on which the end side with the contact surface is arranged, and secondly constitutes a targeted structural weakening, which leads to softer compression behavior of the spring element. This groove is preferably a first groove, and the spring element has, at further distances in each case, one or more further transverse grooves which likewise take on the function of a structural weakening.

The maximum constriction of the groove or of the grooves preferably lies within a range of 55% to 75% of the maximum diameter of the basic body transversely with respect to the longitudinal axis, and is furthermore preferably spaced apart from the end side of the basic body at a distance of 15% to 25% of the length of the basic body in the direction of the longitudinal axis.

The basic body is preferably configured as a hollow body and has a cavity in the direction of the longitudinal axis, preferably coaxially with respect to the longitudinal axis, wherein the cavity has at least one cross-sectional tapering, and the contact surface extends at least as far as the cross-sectional area.

In a further preferred embodiment of the invention, which at the same time also constitutes an independent second aspect of the invention, a plurality of depressions are provided in the end side of the basic body and, in the end edge, define a number of spaced-apart projections in the direction of the longitudinal axis. Owing to the fact that, in the end edge, a number of projections and adjacent "valleys" are now formed by the depressions, the starting contour of the spring element is optimized. By reducing the area of "first contact" to merely the projections of the end edge, the contact rigidity of the spring element upon striking of the damper cap against the end side of the basic body is further reduced. The invention therefore additionally independently achieves the object on which it is based by a spring element for a vehicle shock absorber, having a longitudinal axis and a basic body which extends along the longitudinal axis and is resiliently deformable between an uncompressed basic state and a state compressed in the direction of the longitudinal axis, and which has an end side with a contact surface configured for contact against a damper cap of the vehicle shock absorber, wherein the end side of the basic body has an encircling end edge in the basic state, and a plurality of depressions are provided in the end side of the basic body, said depressions, in the end edge, defining a number of spaced-apart projections in the direction of the longitudinal axis.

The projections project relative to the depressions preferably by 2 mm or more in the direction of the longitudinal axis. The projections particularly preferably project relative to the depressions by 4 mm +/−15% in the direction of the longitudinal axis. This preferred dimensioning achieves the surprising advantage that an arising compression does not directly completely compress the projections, but rather the entire spring element begins to compress while, as before, a remaining projection remains on the damper cap. This has the effect that gas still trapped between the spring element and the damper cap can escape. If the projection is too small or missing entirely, in certain configurations during the compression a hissing or whistling noise can be perceived, which is caused by the escaping air. This annoying noise is minimized or at best avoided by means of the projections configured according to the invention.

The preferred embodiments described above and described below are at the same time advantageous developments of the spring element of the first aspect and of the second aspect.

In a further preferred embodiment, the end edge has concavely curved portions and convexly curved portions which preferably merge into one another without buckling. The convex and concave portions are preferably connected by means of portions running rectilinearly, or merge directly into one another. Concave and convex portion can be arranged to exchange here, or else concave portions can be arranged adjacent to concave portions, and convex portions adjacent to convex portions.

The concave and convex curvatures are preferably configured in the shape of an arc of a circle.

In a further preferred embodiment of the spring element, the surface of the depressions is partially or completely structured. The structuring is preferably realized as described above. From a certain degree of the compression of the spring element, the surfaces of the depressions also come into contact with the damper cap. It is then advantageous here for said surfaces also to be structured and to share in reducing noise. They are then part of the contact surface.

The spring element according to the invention is developed in that the depressions run at an angle of 20° to 150° to the longitudinal axis, and are preferably aligned with the longitudinal axis.

In preferred embodiments, the basic body is partially or completely composed of an elastomer, preferably of a rubber and/or a polyisocyanate polyaddition product.

A spring element here can be composed of an elastomer, but it can also be composed of a plurality of elastomers which are present in layers, in shell form or in another form or also in a mixture with one another. The polyisocyanate polyaddition products are preferably constructed on the basis of microcellular polyurethane elastomers, on the basis of thermoplastic polyurethane or from combinations of said two materials which may optionally comprise polyurea structures.

Microcellular polyurethane elastomers which, in a preferred embodiment, have a density according to DIN 53420 of 200 kg/m$^3$ to 1100 kg/m$^3$, preferably 300 kg/m$^3$ to 800 kg/m$^3$, a tensile strength according to DIN 53571 of 2 N/mm$^2$, preferably 2 N/mm$^2$ to 8 N/mm$^2$, an elongation according to DIN 53571 of 300%, preferably 300% to 700%, and a tear strength according to DIN 53515 of preferably 8 N/mm to 25 N/mm are particularly preferred.

The elastomers are preferably microcellular elastomers on the basis of polyisocyanate polyaddition products, preferably having cells with a diameter of 0.01 mm to 0.5 mm, particularly preferably 0.01 to 0.15 mm.

Elastomers on the basis of polyisocyanate polyaddition products and the production thereof are known in general and described numerously, for example in EP-A 62 835, EP-A 36 994, EP-A 250 969, DE-A 195 48 770 and DE-A 195 48 771.

Production customarily takes place by reacting isocyanates with compounds which are reactive to isocyanates.

The elastomers on the basis of cellular polyisocyanate polyaddition products are customarily produced in a mold in which the reactive starting components are reacted with one another. Suitable molds here are generally customary molds, for example metal molds, which, on the basis of their shape, ensure the three-dimensional shape according to the invention of the spring element. In one embodiment, the contour elements are integrated directly in the casting mold; in a further embodiment, they are retrospectively incorporated into the concentric basic body. In a preferred embodiment, the concentric spring element is cooled for this purpose until it solidifies, preferably with liquid nitrogen, and processed in this state.

The polyisocyanate polyaddition products can be produced according to generally known methods, for example by the following starting substances being used in a single or two-stage process:
  (a) isocyanate,
  (b) compounds reactive to isocyanates,
  (c) water and optionally
  (d) catalysts,
  (e) blowing agents and/or
  (f) auxiliary and/or additional substances, for example polysiloxanes and/or fatty acid sulfonates.

The surface temperature of the inner wall of the mold is customarily 40° C. to 95° C., preferably 50° C. to 90° C. The production of the molded parts is advantageously carried out at an NCO/OH ratio of 0.85 to 1.20, wherein the heated starting components are mixed and brought in a quantity corresponding to the desired molded part density into a heated, preferably tightly closing molding tool. The molded parts are cured for 5 minutes to 60 minutes and then can be removed from the mold. The quantity of the reaction mixture introduced into the molding tool is customarily dimensioned in such a manner that the molded bodies obtained have the density already presented. The starting components are customarily introduced into the molding tool at a temperature of 15° C. to 120° C., preferably of 30° C. to 110° C. The degrees of compression for producing the molded bodies lie between 1.1 and 8, preferably between 2 and 6. The cellular polyisocyanate polyaddition products are expediently produced according to the "one shot" method with the aid of high-pressure technology, low-pressure technology or in particular reaction injection molding technology (RIM) in open or preferably closed molding tools. The reaction is carried out in particular by compression in a closed molding tool. The reaction injection molding technology is described, for example, by H. Piechota and H. Röhr in "Integralschaumstoffe", Carl Hanser-Verlag, Munich, Vienna 1975; D. J. Prepelka and J. L. Wharton in Journal of Cellular Plastics, March/April 1975, pages 87 to 98 and U. Knipp in Journal of Cellular Plastics, March/April 1973, pages 76-84.

The spring element according to the invention preferably has dimensions, i.e. lengths and diameters, which are matched to the use as an additional spring and/or main shock absorber. The spring element preferably has a length in the longitudinal direction within a range of 30 mm to 200 mm, particularly preferably within a range of 40 mm to 120 mm. Furthermore preferably, the maximum outer diameter transversely with respect to the longitudinal axis of the spring element lies within a range of 30 mm to 100 mm, particularly preferably within a range of between 40 mm and 70 mm. The cavity of the spring element preferably lies within a range of between 10 mm and 30 mm.

The invention achieves the object on which it is based and which is mentioned at the beginning with a vehicle shock absorber of the type mentioned at the beginning by said vehicle shock absorber having a damper bearing, a damper cap mounted movably relative to the damper bearing in the direction of a longitudinal axis, and a spring element with a basic body extending along the longitudinal axis, wherein the basic body is resiliently deformable between an uncompressed basic state and a state compressed in the direction of the longitudinal axis, and has an end side with a contact surface configured for contact against the damper cap of the vehicle shock absorber, wherein the contact surface is partially or completely structured. With regard to the advantages which are achieved by the vehicle shock absorber according to the invention which is equipped with the spring element, reference is made to the statements above. The preferred embodiments of the above-described spring element are at the same time also preferred embodiments of the vehicle shock absorber according to the invention.

The invention achieves the object on which it is based furthermore with a vehicle of the type mentioned at the beginning which has a number of vehicle shock absorbers by at least one, preferably a plurality of or all of the vehicle shock absorbers being configured according to one of the above-described preferred embodiments, or having a spring element according to one of the above-described preferred embodiments.

Furthermore, the invention relates to a use of a spring element as a main shock absorber or as an additional spring in a vehicle shock absorber. The invention achieves the object on which it is based in such a use by the spring element being configured according to one of the above-described preferred embodiments.

Figure 2:
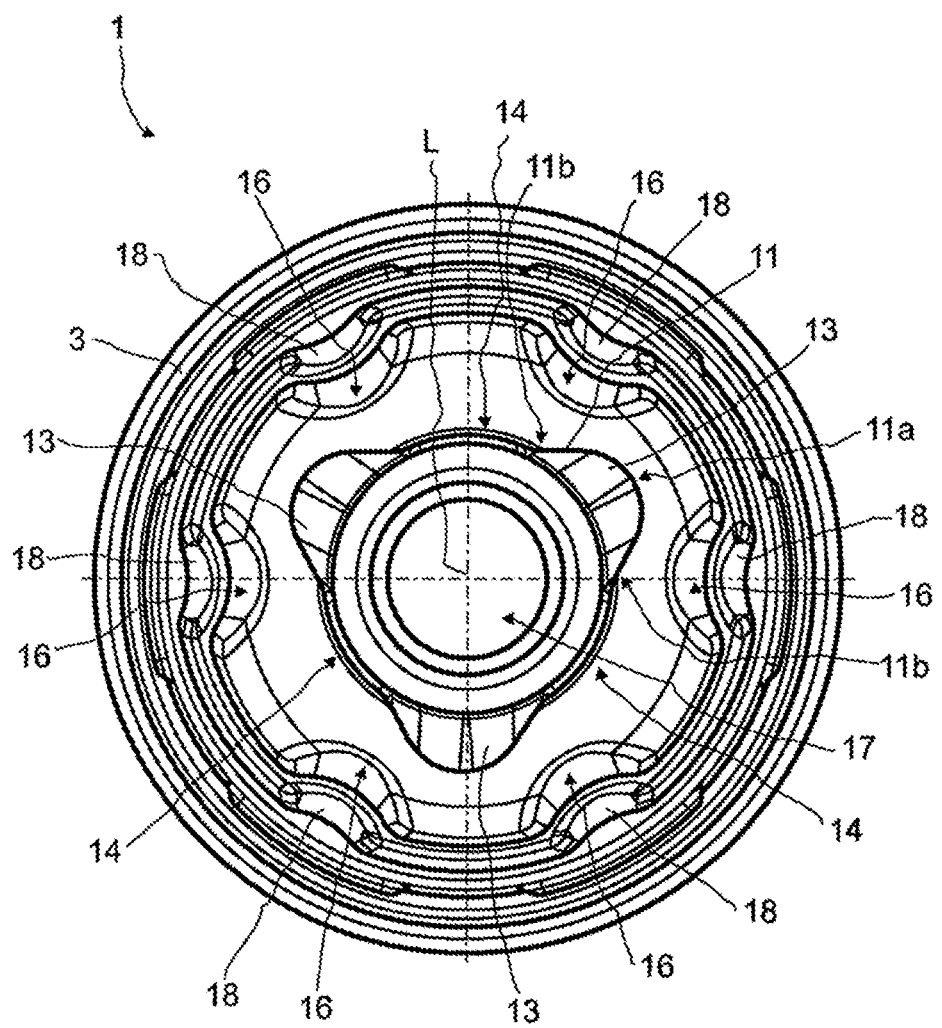
Figure 3:
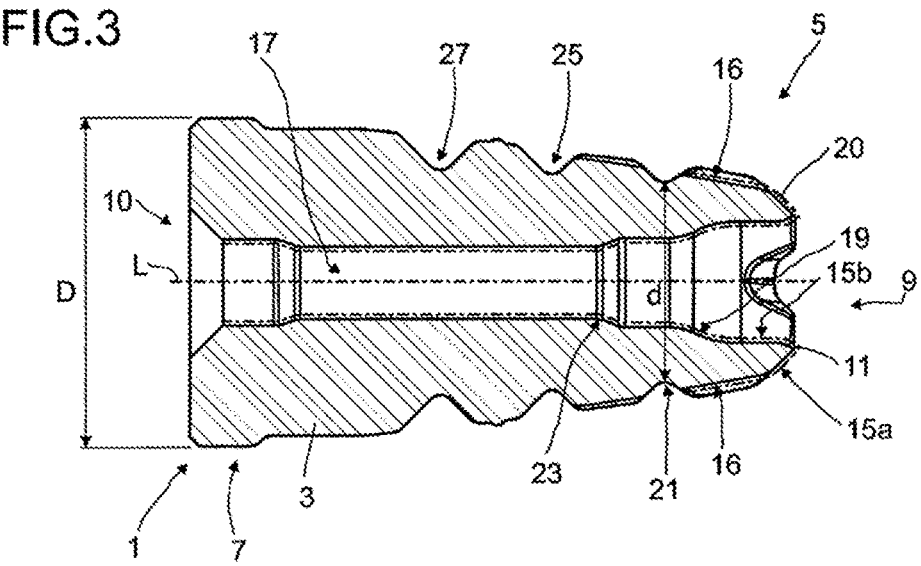
Figure 4:
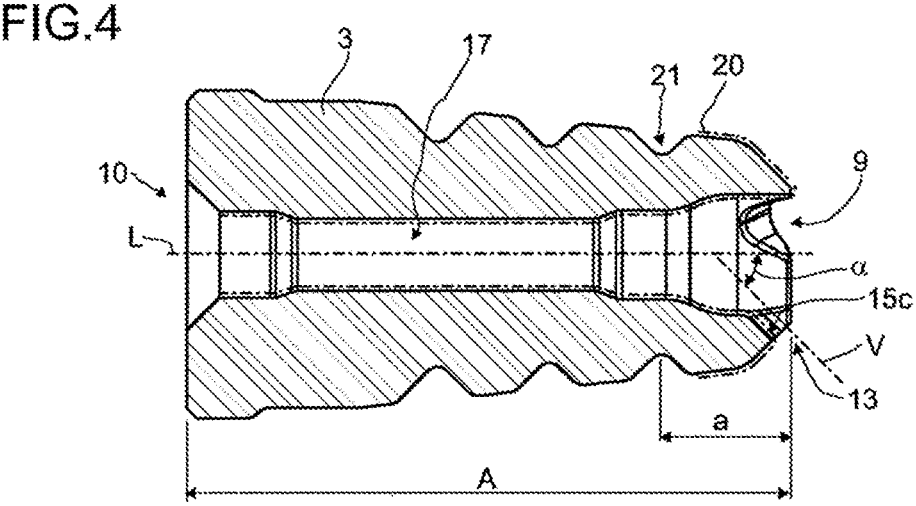

The invention is described below using a preferred example with reference to the attached figures, in which:

FIG. 1 shows a three-dimensional diagrammatic illustration of a spring element according to a preferred embodiment, FIG. 2 shows a top view of the end side of the spring element according to FIG. 1, FIG. 3 shows a first cross-sectional view through the spring element according to FIGS. 1 and 2, and FIG. 4 shows a further cross-sectional view through the spring element according to FIGS. 1 to 3.

FIG. 1 first of all illustrates a spring element 1 three-dimensionally and diagrammatically. The spring element 1 has an elongate basic body 3. The basic body 3 has a longitudinal axis L which extends from a first end portion 5 as far as a second end portion 7. An end side 9 is formed on the first end portion 5. A second end side 10 is arranged opposite on the opposite end portion 7.

An end edge 11 is formed on the first end side 9 of the basic body 3. The end edge 11 constitutes that part of the spring element 1 which first of all comes into contact with a damper cap of a shock absorber when the spring element 1 is installed in a vehicle shock absorber, and the shock absorber is compressed.

A plurality of depressions 13, three in the preferred example, are admitted in the end side 9. The admission of the depressions 13 has the result that the end edge 11 is not configured strictly annularly, but rather is configured with a corresponding number of projections 14 by means of the depressions 13. The projections 14 project in the direction of the longitudinal axis L relative to the depressions 13. This has the result that the first contact with the damper cap is not produced with the entire end edge 11, but rather merely with the respective part of the end edge 11 that runs along the projections 14. The starting behavior of the spring element is thereby configured to be softer because the contact rigidity decreases. A first part 15a of a contact surface is formed radially outside the end edge 11 and, as compression progresses, passes into contact with the damper cap. A second part 15b of the contact surface is formed radially inside the end edge 11 and, by the material of the spring element 1 bulging and being radially deflected, can likewise come into contact with the damper cap.

Along the lateral circumferential surface of the basic body 3, a plurality of longitudinal grooves 16 running substantially in the longitudinal direction of the longitudinal axis L are arranged laterally, at least in the first end portion 5, and also, as specific structural weakenings, also have a positive influence on the deflection behavior and provide for soft deflection. The longitudinal grooves 16 preferably run at an acute angle of 15° or less, particularly preferably less than 10°, with respect to the longitudinal axis L. Further longitudinal grooves 18 or aligned continuations of the longitudinal grooves 16 are optionally also arranged on the other side of the end portion 5. They take on the same function as the longitudinal grooves 16.

As furthermore emerges in particular from FIG. 2, the spring element 1 is configured as a hollow body and has a cavity 17 formed coaxially with respect to the longitudinal axis L. The cavity 17 preferably extends from the first end side 9 through the basic body 3 as far as the second end side 10 (FIGS. 3, 4).

FIG. 2 shows a top view of the end side of the first end side 9. While the longitudinal grooves 16 (and 18) are distributed in a substantially axially symmetrical manner lying opposite one another in pairs and uniformly over the circumference of the spring element 1, the three end-side depressions 13 are distributed uniformly over the circumference at an angle of 120° with respect to one another. In principle, different numbers of depressions 13 also lie within the scope of the according to the invention. As clearly emerges from FIG. 2, the end edge 11 in each case has, on its projections 14, two adjacent convex curvatures 11b, while the depressions each have a concave curvature 11a. The convex and concave curvatures 11a, b merge into each other either directly or separately by means of rectilinear portions without buckling. The outer peripheral contour of the basic body 3 is of substantially frustoconical configuration and is interrupted by the longitudinal grooves 16, 18 and one or more transverse grooves 21, 23, 25 (FIGS. 3, 4).

FIGS. 3 and 4 disclose the structure of the depressions 13 and of the interior of the basic body 3 of the spring element 1. The structuring of the contact surface 15a, b is shown in FIGS. 3 and 4 by a dashed line 20. The structuring 20 extends on the outer part 15a of the contact surface from the first end side 9 as far as the beginning of a first transverse groove 21. The first transverse groove 21 is arranged at a distance a from the first end side 9. At the point of the lowest constriction, the first transverse groove 21 has a diameter d.

The longitudinal grooves 16 preferably likewise have a structured surface as an extension of the contact surface 15a, which extends as far as the first transverse groove 21.

A first cross-sectional tapering 19 is provided on the inner side in the cavity 17 of the basic body 3. The structured surface preferably extends as an extension of the contact surface 15b at least as far as the first tapering. Furthermore preferably, a second cross-sectional tapering 23 is provided in the cavity 17, wherein the structuring 20 of the surface extends at least as far as said second cross-sectional tapering. Even more preferably, the structuring of the surface continues through the entire hollow space 17.

In addition to the first transverse groove 21, preferably one or more further transverse grooves 25, 27 are arranged on the outer side of the basic body 3, in each case at distances from one another.

The diameter d of the first transverse groove 21 preferably lies within a range of 55% to 75% of the maximum diameter D of the basic body 3 in the second end portion 7. The distance a of the first transverse groove 21 from the first end side 9 preferably lies within a range of 15% to 25% of the maximum length A of the basic body 3 in the direction of the longitudinal axis L.

As emerges in particular from FIG. 4 by way of example for one of the depressions 13, the latter are oriented at an angle α relative to the longitudinal axis L. The angle α is preferably within a range of 30° to 150°. In the example shown, it is approximately 45°. The depressions are oriented in the direction of an axis V. In embodiments in which the axis V does not intersect the longitudinal axis L, the angle is determined starting from that point on the axis V which is at the smallest distance from the longitudinal axis L, wherein the angle is defined in the same plane in which the axis V lies and which lies perpendicularly to the perpendicular of the origin of the angle to the longitudinal axis L.

The depressions 13 have a cross section in the shape of an arc of a circle in the direction of the axis V. In alternative preferred embodiments, the depressions 13 have an oval, in particular elliptical, or polygonal, in particular triangular, rectangular, or trapezoidal cross section with respect to the axis V, or consist of combinations of abovementioned basic shapes. In the example shown, the depressions are configured with a constant cross section in the direction of the axis V. In alternative preferred embodiments, the depressions 13 have a cross section which is at least partially tapered or at least partially expanded in the direction of the cavity 17.

The invention claimed is:

1. A spring element for a vehicle shock absorber, comprising:
    a longitudinal axis; and
    a basic body which extends along the longitudinal axis and is resiliently deformable between an uncompressed basic state and a state compressed in a direction of the longitudinal axis, and including an end side including a contact surface configured for contact against a damper cap of the vehicle shock absorber;
    wherein the end side of the basic body includes an encircling end edge in the basic state, and
    wherein the contact surface is partially or completely structured with a structuring that extends radially outside and inside the end edge with respect to the longitudinal axis and provides increased adhesion capacity outside and inside the end edge,
    wherein the basic body is configured as a hollow body and includes a cavity in the direction of the longitudinal axis, or coaxially with respect to the longitudinal axis,
    wherein the cavity includes at least one cross-sectional tapering,
    wherein the structured contact surface extends at least as far as the cross-sectional tapering, wherein the cross-sectional tapering is longitudinally spaced from the end edge, and wherein the structuring of the contact surface comprises graining, simple grooving, crosswise grooving, and/or pimpling outside and inside the end edge.

2. The spring element according to claim 1, wherein the structuring includes a multiplicity of structural elevations and structural depressions, wherein the structural elevations are separated from one another by the structural depressions, and wherein the structuring has an average peak to valley height RZ within a range of 25 to 500 μm.

3. The spring element according to claim 1, wherein the basic body includes at least one encircling groove spaced apart from the end side, wherein the structured contact surface extends as far as the groove.

4. The spring element according to claim 1, wherein the basic body is partially or completely composed of an elastomer.

5. A vehicle shock absorber comprising:

a spring element configured according to claim 1.

6. The spring element according to claim 1, wherein the cavity includes at least a first cross-sectional tapering and a second cross-sectional tapering, wherein the first cross-sectional tapering and the second cross-sectional tapering are each longitudinally spaced from the end edge, and wherein the first cross-sectional tapering is longitudinally spaced from the second cross-sectional tapering.

7. The spring element according to claim 6, wherein the second cross-sectional tapering is longitudinally spaced from a region of the structured contact surface which extends radially inside the end edge.

8. The spring element according to claim 1, wherein a plurality of depressions are provided in the end side of the basic body and, in the end edge, define a number of spaced-apart projections in the direction of the longitudinal axis, the projections projecting by 2 mm or more in the direction of the longitudinal axis.

9. The spring element according to claim 8, wherein a total of three projections are formed on the end side of the basic body, the projections defining a surface, which is reduced to three partial surfaces, for contacting the damper cap.

10. The spring element according to claim 8, wherein a surface of each of the plurality of depressions is partially or completely structured.

11. The spring element according to claim 8, wherein the depressions run at an angle of 20° to 150° to the longitudinal axis.

12. A vehicle shock absorber, comprising:

a damper bearing;

a damper cap mounted movably relative to the damper bearing in a direction of a longitudinal axis; and a spring element including:

a basic body which extends along the longitudinal axis and is resiliently deformable between an uncompressed basic state and a state compressed in the direction of the longitudinal axis, and which includes an end side including a contact surface configured for contact against the damper cap of the vehicle shock absorber, wherein the end side of the basic body includes an encircling end edge in the basic state, wherein the contact surface is partially or completely structured with a structuring that extends radially outside and inside the end edge with respect to the longitudinal axis and provides increased adhesion capacity outside and inside the end edge, wherein the basic body is configured as a hollow body and includes a cavity in the direction of the longitudinal axis, or coaxially with respect to the longitudinal axis, wherein the cavity includes at least one cross-sectional tapering, wherein the structured contact surface extends at least as far as the cross-sectional tapering, wherein the cross-sectional tapering is longitudinally spaced from the end edge, and wherein the structuring of the contact surface comprises graining, simple grooving, crosswise grooving. and/or pimpling outside and inside the end edge.

13. A vehicle, comprising a number of vehicle shock absorbers, wherein at least one or all of the vehicle shock absorbers are configured according to claim 12.

14. A spring element as a main shock absorber or as an additional spring in a vehicle shock absorber, the spring element configured according to claim 12.

15. A spring element for a vehicle shock absorber, comprising:

a longitudinal axis; and a basic body which extends along the longitudinal axis and is resiliently deformable between an uncompressed basic state and a state compressed in a direction of the longitudinal axis, and including an end side including a contact surface configured for contact against a damper cap of the vehicle shock absorber;

wherein the end side of the basic body includes an encircling end edge in the basic state, and wherein the contact surface is partially or completely structured with a structuring that extends radially outside and inside the end edge with respect to the longitudinal axis, wherein the basic body is configured as a hollow body and includes a cavity in the direction of the longitudinal axis, or coaxially with respect to the longitudinal axis, wherein the cavity includes tapering, consisting of One or more inward cross-sectional tapering regions, wherein the structured contact surface extends at least as far as the cross-sectional tapering, wherein the cross-sectional tapering is longitudinally spaced from the end edge, and wherein the structuring of the contact surface comprises ,graining, simple grooving, crosswise grooving, and/or pimpling outside and inside the end edge.

16. The spring element according to claim 15, wherein the structuring of the contact surface provides increased adhesion capacity outside and inside the end edge.

* * * * *